3,222,341
PROCESS FOR POLYMERIZING STYRENE
Gerald R. Barrett, Winchester, and Alva F. Harris, Wilbraham, Mass., assignors to Monsanto Company, a corporation of Delaware
No Drawing. Filed Aug. 1, 1961, Ser. No. 128,370
5 Claims. (Cl. 260—93.5)

This invention relates to the mass polymerization of styrene. More particularly, the invention relates to a mass polymerization process for preparing moldable polystyrene having a low residual monomer content.

It is already known that parameters such as the catalyst concentration and the time and temperature of the reaction must be controlled in the mass polymerization of styrene in order for the product to have a molecular weight suitable for a molding powder, i.e., a Staudinger average molecular weight of 40,000–100,000. It is also known that the product usually has an undesirably high residual monomer content when the parameters of the reaction are controlled to achieve this regulation of molecular weight.

U.S. Patent 2,675,362 shows that the parameters of the mass polymerization process can be controlled to form a moldable polystyrene having a residual monomer content as low as 0.35–0.5% by conducting the polymerization in the presence of an alkanoic acid containing 12–20 carbon atoms, with or without a dialkyl peroxide, alkyl perbenzoate, or alkyl peracetate as a catalyst. Reduction of the residual monomer content is shown to result in improving the physical and molding properties of the polymer.

It would obviously be desirable to be able to reduce the residual monomer content of moldable mass-polymerized styrene to a level even lower than 0.35–0.5%, since an even greater improvement in the physical and molding properties of the polymer might be expected with the greater reduction of residual monomer content. An even more important advantage of being able to achieve greater reduction of the residual monomer content would be the decreased likelihood that anomalously higher-than-normal residual monomer contents, such as are occasionally encountered when styrene is mass-polymerized on a commercial scale, would reach undesirably high levels.

An object of the invention is to provide a novel process for the mass polymerization of styrene.

Another object is to provide a mass process for polymerizing styrene to a moldable polymer containing a minimum amount of residual monomer.

These and other objects are attained by polymerizing styrene in the presence of a monomer-soluble mixture of (1) an organic hydroperoxide having a half-life of at least 10 hours in benzene at 100° C., (2) a peroxy compound having a half-life of at least 10 hours in benzene at 100° C. and corresponding to the mormula ROOR', wherein both R and R' represent organic radicals, and (3) a monocarboxyhydrocarbon having a dissociation constant not higher than $1.0 \times 10^{-4}$ at 25°C., the polymerization being conducted by a mass process utilizing a fairly specific time-temperature cycle as hereinafter defined.

The following examples are given to illustrate the invention. Unless otherwise specified, quantities mentioned are quantities by weight.

EXAMPLE I (Control)

0.04 part of di-t-butyl peroxide and 0.28 part of stearic acid are dissolved in 100 parts of styrene containing about 0.004–0.005 part of dissolved oxygen. The reaction vessel is purged with nitrogen and heated at 90° C. for 24 hours to convert about 28% of the styrene to polymer. The temperature is then gradually raised to 200° C. over a period of 5 hours and maintained at 200° C. for an additional hour. The polystyrene product has a Staudinger average molecular weight in the range of 40,000–100,000 and a residual monomer content of 0.48%.

EXAMPLE II

Three batch reactions are conducted by repeating Example I except for substituting the indicated amounts of t-butyl hydroperoxide (90% active) and di-t-butyl peroxide for the 0.04 part of di-t-butyl peroxide. In each case the total amount of hydroperoxide and peroxide employed is equivalent in molar concentration to 0.04 part of di-t-butyl peroxide. The polystyrene products of the three reactions have Staudinger average molecular weights in the range of 40,000–100,000. The residual monomer contents of the products, together with the amounts of hydroperoxide and peroxide employed in each of the reactions, are shown below.

| Reaction | t-Butyl Hydroperoxide (Parts) | Di-t-Butyl Peroxide (Parts) | Residual Monomer (Percent) |
|---|---|---|---|
| A | 0.0068 | 0.03 | 0.10 |
| B | 0.0137 | 0.02 | 0.13 |
| C | 0.021 | 0.01 | 0.07 |

As shown above, the residual monomer contents of the products of this example represent an approximately 73–85% reduction of the residual monomer content of the polystyrene of Example I. This effect of a combination of t-butyl hydroperoxide and di-t-butyl peroxide in a polymerization system containing stearic acid is the opposite of its effect in a system which does not contain stearic acid. When Examples I and II are repeated with the exception that no stearic acid is employed, the residual monomer contents of the products prepared in the presence of the combination of hydroperoxide and peroxide represent an approximately 2–65% increase of the residual monomer content of the polystyrene prepared in the presence of di-t-butyl peroxide without hydroperoxide.

EXAMPLE III

Three batch reactions are conducted by repeating Example II except for employing 0.4 part of stearic acid instead of 0.28 part in each of the reactions. The three polystyrene products are substantially the same as the products of the three corresponding reactions of Example II.

EXAMPLE IV

Three batch reactions are conducted by repeating Example II except for substituting 0.1 part of benzoic acid for the 0.28 part of stearic acid in each of the reactions. These reactions, like the corresponding reactions of Example II, result in the formation of moldable polystyrene products having very low residual monomer contents.

EXAMPLE V

Three batch reactions are conducted by repeating Example II except for substituting 0.06 part of acetic acid for the 0.28 part of stearic acid in each of the reactions. These reactions, like the corresponding reactions of Example II, result in the formation of moldable polystyrene products having very low residual monomer contents.

EXAMPLE VI (Control)

0.04 part of di-t-butyl peroxide and 0.28 part of stearic acid are dissolved in 100 parts of styrene containing about 0.004–0.005 part of dissolved oxygen. The reaction vessel is purged with nitrogen and heated at 90° C. for 24 hours to convert about 30% of the styrene to polymer. The temperature is then gradually raised to 185° C. over a period of 4.5 hours and maintained at 185° C. for an additional 4 hours. The polystyrene product has a Staudinger average molecular weight in the range of 40,000–100,000 and a residual monomer content of 1.13%.

EXAMPLE VII

Example VI is repeated except for substituting a mixture of .03 part of di-t-butyl peroxide and 0.0143 part of 73% active cumene hydroperoxide for the 0.04 part of di-t-butyl peroxide. The polystyrene product has a Staudinger average molecular weight in the range of 40,000–100,000 and a residual monomer content of 0.24%.

EXAMPLE VIII

Four batch reactions are conducted by dissolving 0.0068 part of 90% active t-butyl hydroperoxide, 0.03 part of di-t-butyl peroxide, and 0.28 part of stearic acid in 100 parts of styrene, heating at 90° C. until 15–18% of the styrene has been converted to polymer, gradually raising the temperature to 185° C. over the specified periods of time, and maintaining the reaction temperature at 185° C. for the specified periods of time. Each of the polystyrene products has a Staudinger average molecular weight in the range of 40,000–100,000. The residual monomer contents of the products, together with the reaction conditions employed in the polymerizations, are shown below.

| Reaction | Time at 90–185° C. (Hours) | Time at 185° C. (Hours) | Residual Monomer (Percent) |
|---|---|---|---|
| A | 3.5 | 1 | 0.09 |
| B | 3.5 | 3 | 0.08 |
| C | 6.25 | 0.5 | 0.30 |
| D | 6.25 | 1.5 | 0.23 |

EXAMPLE IX

Four batch reactions are conducted by dissolving 0.001 part of 90% active t-butyl hydroperoxide, 0.04 part of di-t-butyl peroxide, and 0.28 part of stearic acid in 100 parts of styrene, heating at 90° C. until 15–18% of the styrene has been converted to polymer, gradually raising the temperature to 185° C. over the specified periods of time, and maintaining the reaction temperature at 185° C. for the specified periods of time. Each of the polystyrene products has a Staudinger average molecular weight in the range of 40,000–100,000. The residual monomer contents of the products, together with the reaction conditions employed in the polymerizations, are shown below.

| Reaction | Time at 90–185° C. (Hours) | Time at 185° C. (Hours) | Residual Monomer (Percent) |
|---|---|---|---|
| A | 3.5 | 1 | 0.04 |
| B | 3.5 | 3 | 0.08 |
| C | 6.25 | 0.5 | 0.35 |
| D | 6.25 | 1.5 | 0.29 |

The present invention is a process for preparing moldable polystyrene containing a minimum amount of residual monomer by polymerizing styrene in the presence of a monomer-soluble mixture of (1) an organic hydroperoxide having a half-life of at least 10 hours in benzene at 100° C., (2) a peroxy compound having a half-life of at least 10 hours in benzene at 100° C. and corresponding to the formula ROOR′, wherein both R and R′ represent organic radicals, and (3) a monocarboxyhydrocarbon having a dissociation constant not higher than $1.0 \times 10^{-4}$ at 25° C. by a mass process utilizing a fairly specific time-temperature cycle.

Any monocarboxyhydrocarbon having a dissociation constant not higher than $1.0 \times 10^{-4}$ at 25° C. is utilizable in the practice of the invention. Among the suitable monocarboxyhydrocarbons are acids such as acetic, hexanoic, benzoic, phenylacetic, isopropylbenzoic, and hexahydrobenzoic acids and, as a preferred embodiment of the invention, alkanoic acids containing 12–20 carbon atoms (i.e., lauric, tridecanoic, myristic, pentadecanoic, palmitic, margaric, stearic, nonadecanoic, and eicosanic acids). Stearic acid is especially preferred because of the brilliance it imparts to objects molded from polystyrene.

The reaction mixture should contain at least 0.05% of the monocarboxyhydrocarbon, based on the weight of styrene, and usually contains not more than 1% of the acid. Within the range of 0.05–1.0% and at higher concentrations, variation in the concentration of a particular acid seems to have no substantial effect on the molecular weights and residual monomer contents of the polymers formed by the reaction, but it is usually preferred to avoid concentrations of acid higher than 1% in order to prevent undue yellowing of the polymer. Ordinarily the reaction mixture will contain 0.1–6% of acid, based on the weight of styrene.

The organic hydroperoxide employed in the reaction can be any organic hydroperoxide having a half-life of at least 10 hours in benzene at 100° C. (See D. F. Doehnert et al., "Evaluation of organic peroxides from half-life data," Modern Plastics, vol. 36, February 1959, page 142 et seq., for a disclosure of half-life data for many common peroxy compounds and for a discussion of the determination of the these data.) Among the utilizable hydroperoxides are t-butyl hydroperoxide, cumene hydroperoxide, p-menthane hydroperoxide, cyclopentane hydroperoxide, diisopropylbenzene hydroperoxide, p-t-butylcumene hydroperoxide, pinane hydroperoxide, 2,5-dimethylhexane-2,5-dihydroperoxide, etc. The amount of organic hydroperoxide used is in the range of 0.001–0.5%, preferably 0.005–0.02%, based on the weight of styrene.

The peroxy compound used in conjunction with the organic hydroperoxide and monocarboxyhydrocarbon has a half-life of at least 10 hours in benzene at 100° C. and corresponds to the formula ROOR′, wherein both R and R′ represent organic radicals. Utilizable peroxy compounds include, e.g. di-t-butyl diperphthalate, t-butyl peracetate, t-butyl perbenzoate, dicumyl peroxide, di-t-butyl peroxide, 2,5-dimethyl-2,5-di(t-butylperoxy)hexane, 2,5-dimethyl-2,5-di(t-butylperoxy)hexyne-3, etc. The peroxy compound is employed in concentrations of 0.01–0.1%, preferably 0.01–0.04%, based on the weight of styrene.

In order for a moldable polystyrene having a minimum residual monomer content to be prepared in the presence of the organic hydroperoxide/peroxy compound/monocarboxy-hydrocarbon mixture, the process must utilize a fairly specific time-temperature cycle. In the first stage of the reaction, polymerization is conducted at 75–125° C. for about 6–24 hours until 15–45% of the monomer has been converted to polymer; in the second stage, the reaction temperature is gradually raised from 75–95° C. to 180–200° C. over a period of about 3–7 hours; in the final stage, the reaction temperature is maintained at 180–200° C. for about 0.5–5 hours.

The manner of manipulating the reaction temperature during the first stage of the reaction in order to be in the 75–95° C. range for the beginning of the second stage of the reaction is not critical, e.g., an initial reaction temperature of about 100–125° C. can be gradually lowered to 75–95° C. during the first stage of the reaction or the reaction temperature can be maintained at 75–95° C. throughout the first stage of the reaction, etc. According to a preferred embodiment of the invention, the reaction mixture is initially heated to 105–115° C. and maintained at a temperature gradually decreased to 90° C. until about 25–45% conversion to polymer is obtained, after which the reaction temperature is gradually raised to 180–200° C. over a period of about 3–7 hours and then maintained at 180–200° C. for about 2–5 hours to complete the reaction. Especially good results are also obtained by initially heating the reaction mixture at 90° C. to about 25–35% conversion of styrene to polystyrene, then heating at a temperature gradually raised to 180–200° C. over a period of about 4–5 hours, and finally heating at 180–200° C. for 2–4 hours.

In most cases, the methods of varying one or more of the parameters of the reaction within the above-indicated limitations to achieve a desired result will be obvious to those skilled in the art. It should also be noted that (1) the minimum amount of free radical polymerization initiator required for the reaction decreases with increased concentrations of monocarboxyhydrocarbon, (2) the residual monomer content of the product decreases with an increase in the degree of polymerization accomplished at 75–125° C., and (3) the minimum required ratio of organic hydroperoxide to peroxy compound in the reaction mixture decreases with a decrease in the degree of polymerization accomplished at the lower polymerization temperatures of the cycle.

The process of the invention is advantageous in that it permits the formation of moldable polystyrene having a lower residual monomer content than the moldable mass-polymerized styrene products of the prior art. The reduced residual monomer content improves the physical and molding properties of the polymers.

It is obvious that variations can be made in the products and processes set forth above without departing from the spirit and scope of this invention.

What is claimed is:

1. A mass polymerization process which comprises (1) forming a reaction mixture by dissolving in 100 parts by weight of styrene a monomer-soluble mixture of (a) 0.001–0.5 part by weight of an organic hydroperoxide having a half-life of at least 10 hours in benzene at 100° C., (b) 0.01–0.1 part by weight of a peroxy compound having a half-life of at least 10 hours in benzene at 100° C. and corresponding to the formula ROOR', wherein both R and R' represent organic radicals, and (c) at least 0.05 part by weight of a monocarboxyhydrocarbon of the group consisting of acetic acid, hexanoic acid, benzoic acid, phenylacetic acid, isopropylbenzoic acid, hexahydrobenzoic acid, and an alkanoic acid containing 12–20 carbon atoms (2) heating the reaction mixture at 75–125° C. until 15–45% conversion to polymer is obtained, the temperature being so regulated as to be in the 75–95° C. range at the time that this conversion is obtained, (3) gradually raising the reaction temperature to 180–200° C. over a period of about 3–7 hours, and (4) maintaining the reaction temeprature at 180–200° C. for about 0.5–5 hours.

2. A mass polymerization process which comprises (1) forming a reaction mixture by dissolving in 100 parts by weight of styrene a monomer-soluble mixture of (a) 0.001–0.5 part by weight of an organic hydroperoxide having a half-life of at least 10 hours in benzene at 100° C., (b) 0.01–0.1 part by weight of a peroxy compound having a half-life of at least 10 hours in benzene at 100° C. and corresponding to the formula ROOR', wherein both R and R' represent organic radicals, and (c) at least 0.05 part by weight of an alkanoic acid containing 12–20 carbon atoms, (2) heating the reaction mixture at 75–125° C. until 15–45% conversion to polymer is obtained, the temperature being so regulated as to be in the 75–95° C. range at the time that this conversion is obtained (3) gradually raising the reaction temperature to 180–200° C. over a period of about 3–7 hours, and (4) maintaining the reaction temperature at 180–200° C. for about 0.5–5 hours.

3. A mass polymerization process which comprises (1) forming a reaction mixture by dissolving 0.001–0.5 part by weight of t-butyl hydroperoxide, 0.01–0.1 part by weight of di-t-butyl peroxide, and at least 0.05 part by weight of stearic acid in 100 parts by weight of styrene, (2) heating the reaction mixture at 75–125° C. until 15–45% conversion to polymer is obtained, the temperature being so regulated as to be in the 75–95° C. range at the time that this conversion is obtained, (3) gradually raising the reaction temperature to 180–200° C. over a period of about 3–7 hours, and (4) maintaining the reaction temperature at 180–200° C. for about 0.5–5 hours.

4. A mass polymerization process which comprises (1) forming a reaction mixture by dissolving 0.005–0.02 part by weight of t-butyl hydroperoxide, 0.01–0.04 part by weight of di-t-butyl peroxide, and 0.1–0.6 part by weight of stearic acid in 100 parts by weight of styrene, (2) heating the reaction mixture to 105–115° C. and then gradually lowering the temperature to 90° C. to obtain 25–45% conversion to polymer, (3) gradually raising the temperature to 180–200° C. over a period of about 3–7 hours, and (4) maintaining the reaction temperature at 180–200° C. for 2–5 hours.

5. A mass polymerization process which comprises (1) forming a reaction mixture by dissolving 0.005–0.02 part by weight of t-butyl hydroperoxide, 0.01–0.04 part by weight of di-t-butyl peroxide, and 0.1–0.6 part by weight of stearic acid in 100 parts by weight of styrene, (2) heating the reaction mixture at 90° C. until 25–35% conversion to polymer is obtained, (3) gradually raising the reaction temperature to 180–200° C. over a period of about 4–5 hours, and (4) maintaining the reaction temperature at 180–200° C. for 2–4 hours.

References Cited by the Examiner
UNITED STATES PATENTS

| | | | |
|---|---|---|---|
| 2,603,629 | 7/1952 | Bloch | 260—93.5 |
| 2,632,758 | 3/1953 | Brothman | 260—93.5 |
| 2,675,362 | 4/1954 | Shusman | 260—93.5 |
| 3,100,195 | 8/1963 | Zomlefer | 260—23 |

JOSEPH L. SCHOFER, *Primary Examiner.*

MARK LIEBMAN, *Examiner.*